United States Patent [19]

Newitzki

[11] 4,237,236

[45] Dec. 2, 1980

[54] PLASTICS MATERIAL AND METHOD OF PRODUCING SAID MATERIAL

[75] Inventor: Berthold Newitzki, Friedrichsdorf, Fed. Rep. of Germany

[73] Assignee: Firma Erich Rühl Chemische Fabrik und Chemikalien-Grosshandel, Friedrichsdorf, Fed. Rep. of Germany

[21] Appl. No.: 46,012

[22] Filed: Jun. 6, 1979

[30] Foreign Application Priority Data

Jun. 9, 1978 [DE] Fed. Rep. of Germany ....... 2825295

[51] Int. Cl.$^3$ ................................................ C08J 9/04
[52] U.S. Cl. ..................................... 521/123; 260/38; 260/DIG. 24
[58] Field of Search ........................ 260/38, DIG. 24; 525/502; 521/123

[56] References Cited

U.S. PATENT DOCUMENTS

| | | | |
|---|---|---|---|
| 2,798,054 | 7/1957 | Simon et al. | 521/123 |
| 2,970,121 | 1/1961 | Schmittberger | 260/38 |
| 3,692,706 | 9/1972 | Igglesden | 525/502 |
| 4,016,111 | 4/1977 | Wolff et al. | 260/DIG. 24 |
| 4,051,301 | 9/1977 | Laitar | 525/502 |

*Primary Examiner*—Lewis T. Jacobs
*Attorney, Agent, or Firm*—Webb, Burden, Robinson & Webb

[57] ABSTRACT

A combustion resistant material which will not produce toxic gases when subjected to heat, and which can be formed by moulding or by coating it onto a receiving surface while its constituents are reacting is produced by reacting a mixture of:

62 to 76: percent by weight aluminium oxide or hydroxide
12 to 16: percent by weight phenol resin
11.5 to 17.5: percent by weight furfuryl alcohol with sulphonic acid which serves as hardener, the proportion by weight of the sulphonic acid being from one-tenth to one-twentieth of the amount of aluminium oxide. The viscosity of the reaction mixture can be adjusted by addition of thinners such as butanol or butylglycol, or of thickeners such as chalk, particulate silicic acid, talc or magnesium oxide.

3 Claims, No Drawings

PLASTICS MATERIAL AND METHOD OF PRODUCING SAID MATERIAL

BACKGROUND OF THE INVENTION

This invention relates to a non-combustible material which does not develop toxic fumes, when subjected to heat based upon phenol resins and furfuryl alcohol.

Heat-hardenable plastics moulding preparations based on phenol resins and furfuryl alcohol are already known from German Auslegeschrift No. 11 44 474. The moulding preparations described therein, which are intended to have a high tolerance in the shaping operation and a high hardening speed, do not however possess the properties, hereinafter described, which are characteristic of the materials of the invention.

BRIEF DESCRIPTION OF THE INVENTION

The new material in accordance with the invention is characterised in that it has been obtained by reacting a mixture of 62 to 76 percent by weight of aluminium oxide, 12 to 16 percent by weight of phenol resin and 11.5 to 17.5 percent by weight of furfuryl alcohol with sulphonic acid, with the sulphonic acid present in such an amount that the proportion by weight of sulfonic acid groups amounts to approximately 1/10th to 1/20th of the amount of the aluminum oxide, with subsequent hardening.

In accordance with a preferred embodiment, the material contains, in addition to the aforementioned reaction product, up to 3 percent by weight of finely-particulate silicic acid, up to 0.5 percent by weight of inorganic glass frit, up to 0.4 percent by weight of hardened polyester resin and up to 0.5 percent by weight of hardened epoxy resin individually or in a mixture.

The material can be produced as a shaped or moulded body having a dense structure, for example as a slab or as hard foam or coating on any desired substrate. In this form it serves advantageously as a building component material or roofing material and as a protective material wherever absolute non-combustibility and safety against the development of poisonous fumes is required.

The method of producing the material in accordance with the invention includes reacting a mixture of 62 to 76 percent by weight aluminium oxide, 12 to 16 percent by weight phenol resin and 11.5 to 17.5 percent by weight furfuryl alcohol with sulphonic acid as a hardener and this mixture is, prior to hardening, either introduced into a mould or is applied as a covering or coating to a substrate. The combination of the mixture with the sulphonic acid is an exothermic chemical reaction as a result of which the temperature can rise to 110° C. or above.

The amount of sulphonic acid to be admixed depends, on the one hand, on the desired hardening speed, but on the other hand on the type of sulphonic acid used. The amount of sulphonic acid is to be so selected that the proportion by weight of sulphonic acid groups amounts to approximately between 1/10th and 1/20th by weight of the amount of the aluminium oxide used in the preparation. Phenol sulphonic acids and, particularly phenol-4-sulphonic acid are advantageous in the practice of the invention.

A particularly advantageous material in accordance with the invention is achieved if the aluminium oxide is replaced wholly or partially by aluminium hydroxide (Al(OH)$_3$). This provides a material which is better resistant to fire in that water vapour or steam will be given off simultaneously with decomposition of the aluminium hydroxide into an aluminium oxide, along with consumption of heat, so that the temperature of the material is reduced and the oxygen concentration at the surface is reduced by the escaping water vapour. Both phenomena act in an advantageous manner on the combustion behaviour of the material.

It has proved to be advantageous to admix with the mixture, to improve the mechanical and chemical properties, additionally up to 0.4 percent by weight unsaturated polyester resin and up to 0.5 percent by weight epoxy resin. If one adds, with this proportion of resin, appropriate amounts of hardeners specific to the resins, then these resins harden with the overall composition.

The reaction mixture is, even after the addition of the sulphonic acid, a flowable viscous liquid, which can easily be filled into moulds. The viscosity of the reaction mixture can be influenced within wide limits, either by adding thinning agents such as butanol or butylglycol in amounts of a few percent by weight of thickening agents such as chalk, finely divided silicic acid, finely divided aluminium oxide, talcum or magnesium oxide. The increase in the viscosity is of importance particularly when it is desired to impart to the reaction mixture, prior to the hardening, a paste-like consistency, in order to apply it to substrates for the purposes of forming a covering layer which hardens thereon. Thickening agents can also be admixed with the sulphonic acid. For example, the sulphonic acid can be added in the form of a paste to the mixture, which has been thickened with chalk. Also, in accordance with a particularly preferred embodiment, the sulphonic acid serving as hardener or polymerisation agent can be replaced wholly or partially by paraformaldehyde.

The reaction mixture can also be blown prior to hardening, so that a hard foam is obtained. For this purpose, the mixture is admixed with appropriate amounts of blowing agents, such as fluorocarbon compounds, fluorochlorocarbon compounds and/or sodium bicarbonate. The amount of blowing agent is, of course, governed by the volumetric weight which is desired to be achieved in the resulting hard foam.

A material having particularly favourable properties in accordance with the invention is prepared by using a mixture composed of 64.5 percent by weight aluminium hydroxide, 13 percent by weight phenol resin, 13 percent by weight furfuryl alcohol, 0.4 percent by weight unsaturated polyester resin, 0.45 percent by weight epoxy resin, 2.2 percent by weight paraformaldehyde, 1.4 percent by weight each butanol and ethanol, 2.2 percent by weight butylglycol, 0.4 percent by weight glass frit and 2.8 percent by weight finely divided silicon dioxide reacted with a mixture composed of 16 grams phenol-4-sulphonic acid and 5 grams chalk per 100 grams of aluminium hydroxide, and the composition, prior to hardening, is either applied to a substrate to form a coating or is introduced into a mould. This mixture can also be used to produce a rigid foam, by adding to the mixture, for each 100 grams of aluminium oxide, 0.05 to 0.3 grams of sodium bicarbonate and from 6 to 30 grams of fluorochlorocarbon, and by allowing it to foam in an open mould prior to hardening.

The material in accordance with the invention, after reaction, within which condensation and polymerisation reactions appear to take place, contains the components in a ratio which is optimum for the desired fire protection properties. This ensures that upon combustion or carbonation the organic constituents are retained as insulating or isolating carbon layers in a basic matrix of aluminium oxide, so that the body, or the foam, retains its structure and shape, without combustion products liquifying and/or dropping off or destroying the structure. Moreover, these firmly-adhering carbon layers form a reliable and durable insulation against undesirably high heating of the inner parts of the structure. Since the material in accordance with the invention does not contain any halogen or antimony compounds of any kind, as are customary in many materials for similar purposes, no toxic components of any kind arise in the fumes resulting from combustion or heating to high temperatures. In addition, the material also displays considerable heat-insulating and sound-insulating properties.

EXAMPLES

The invention will be explained further in the following examples, in which all of the given percentages are by weight:

EXAMPLE 1

A mixture of 71 percent finely-particulate aluminium oxide, 12.5 percent furfuryl alcohol, 15 percent phenol resorcinol resin, 0.5 percent epoxy resin, 0.5 percent finely-divided silicic acid (such as that known commercially under the trademark "Aerosil") and 0.5 percent paraformaldehyde are intimately mixed with 7 grams arylsulphonate per 100 grams aluminium oxide. A pasty composition is obtained which is applied as a coating of 1 mm thickness on roof beams and there solidified after about 10 minutes in a form-holding manner and after a further 25 minutes, is completely hardened.

EXAMPLE 2

Work is carried out as in Example 1 above with the difference that 36 percent of the aluminium oxide is replaced by aluminium hydroxide ($Al(OH)_3$). Here, too, a coating is obtained which is absolutely non-combustible and does not develop any toxic fumes when subjected to heat.

EXAMPLE 3

A mixture "A" is produced from: 100 grams aluminium hydroxide (alumina hydrate), 20 grams phenol resin, 20 grams furfuryl alcohol, 2 grams ethanol, 2 grams butanol, 3 grams butylglycol, 3 grams paraformaldehyde, 4 grams finely particulate silicic acid (Aerosil$^R$), 0.6 grams glass frit, 0.6 grams epoxy resin, containing 6 percent by weight hardener constituent, 0.5 grams unsaturated polyester resin, and 3 percent by weight benzoyl peroxide as hardener. This mixture, which is still flowable, is caused to react with a mixture "B" consisting of 16 grams phenol-4-sulphonic acid and 5 grams chalk. Directly afterwards, the mixture is cast in a wooden mould to produce slabs measuring 100 cm×20 cm×2 cm. The temperature of the mixture rises up to 110° C. in the course of the next 4 to 5 minutes. After 30 minutes, the composition is solidified to such an extent that it can be removed from the mould; after 120 minutes it is completely hardened. When studying the fire behaviour in accordance with the Federal German Republic Standard No. DIN 4102, test pieces made from this composition displayed a critical oxygen content (COI) of 100 percent, a criterion for absolute non-combustibility.

To increase the strength properties still further, strengthening and reinforcing agents can be introduced into the slabs.

EXAMPLE 4

The same preparation as in Example 3 was, prior to the hardening after the adding together of the mixtures A and B, additionally mixed with 0.05 grams of sodium bicarbonate and 6 grams fluorochloro hydrocarbon (such as that known under the trademark "Frigen") and cast into an open vessel. After hardening, there was obtained a rigid foam with a volumetric weight of about 500 grams per liter, having cells closed substantially to liquid penetration, i.e. a closed cell foam.

I claim:

1. A non-combustible material which does not develop toxic fumes when subjected to heat, based upon phenol resins and furfuryl alcohol, characterised by having been obtained by reacting a mixture of
   (a) 62 to 76 percent by weight aluminium oxide or aluminium hydroxide;
   (b) 12 to 16 percent by weight phenol resin; and
   (c) 11.5 to 17.5 percent by weight furfuryl alcohol with
   (d) a sulphonic acid in such an amount that the proportion by weight of sulphonic acid groups amounts to about 1/10th to 1/20th of the amount by weight of the aluminium oxide, with subsequent hardening.

2. The material of claim 1 including up to 3 percent by weight of finely-particulate silicic acid, up to 0.5 percent by weight of inorganic glass frit, up to 0.4 percent by weight of hardened polyester resin or up to 0.5 percent by weight of hardened epoxy resin or mixtures thereof.

3. The material of claim 1 in the form of a foam obtained by the addition of blowing agents and having cells which are closed to the passage of liquid.

* * * * *